Sept. 12, 1944. J. D. RYDER 2,358,103
MEASURING APPARATUS
Filed Sept. 25, 1939

Inventor
JOHN D. RYDER
By Raymond D. Junkins
Attorney

Patented Sept. 12, 1944

2,358,103

UNITED STATES PATENT OFFICE 2,358,103

MEASURING APPARATUS

John D. Ryder, University Heights, Ohio, assignor to Bailey Meter Company, a corporation of Delaware Application September 25, 1939, Serial No. 296,336

5 Claims. (Cl. 73—205)

This application is a continuation in part of my copending application Serial No. 251,388, filed in the United States Patent Office on January 17, 1939, now Patent No. 2,275,317, granted March 3, 1942. The invention herein described relates to electric circuits for measuring fluid flows through conduits and the like.

It is an object of my invention to provide an electrically operated system wherein exhibiting devices such as indicators, recorders and/or integrators may be located remotely from a point of measurement.

Another object of my invention is to provide a balanceable electric network employing the null or zero balance principle which, as will be appreciated by those familiar with the art, inherently possesses a high degree of accuracy.

Another object of my invention is to provide an electrically operated impedance bridge operating on the null or zero balance principle, which does not employ a feeler mechanism of the step by step type; but which continuously operates upon a change in a variable to maintain the system in balance, so that the magnitude of the variable is accurately exhibited even during transient periods.

In accordance with my invention I cause an impedance, such as a resistance or inductance in an arm of a bridge circuit to be varied in accordance with the rate of flow and maintain the bridge in balance by varying an impedance in a second arm of the bridge so that the magnitude of the latter becomes a measure of the rate of flow. For a complete understanding of my invention however, reference should be made to the detailed description to follow and to the drawing, in which.

Figure 1:
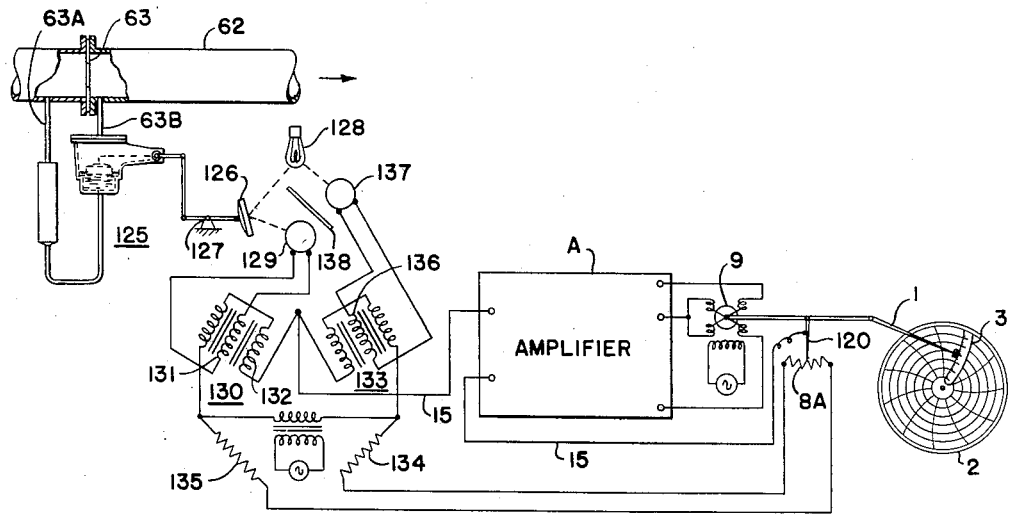
Fig. 1 is a diagrammatic arrangement of apparatus and electric circuit embodying my invention.

Referring now to Fig. 1, I have illustrated my invention arranged to visually exhibit by means of a movable index 1, a cooperating time revoluble chart 2 and scale 3 the magnitude of the rate of flow of a fluid through a conduit 62. The index, chart and scale are merely specific forms of exhibiting means which may take a wide variety of other forms, as will be evident to those skilled in the art.

Positioned in the conduit 62 is a restriction, shown specifically as an orifice 63, which produces a differential pressure varying in correspondence with the rate of fluid flow through the conduit. The differential pressure so produced is conducted through pipes 63A and 63B to a meter 125, which is adapted to angularly position a mirror 126 about a pivot 127 in accordance with the differential pressure.

The mirror 126 reflects more or less light from a suitable source 128 onto a light sensitive device such as a photo-voltaic cell 129 in accordance with the rate of fluid flow. That is to say, the arrangement may be such that as the flow of fluid through the conduit 62 increases the mirror 126 is positioned to reflect a correspondingly increasing amount of light onto the photo-voltaic cell 129. The photo-voltaic cell 129 is shielded from direct light rays from the source 128 by a suitable barrier 138.

A photo-voltaic cell 129 has an electrical characteristic such as resistance or potential variable in correspondence with the amount of light to which it is exposed. Desirably I employ this characteristic to control a saturable core reactor diagrammatically indicated at 130. In the specific embodiment I have disclosed the photo-voltaic cell 129 produces a direct current potential proportional to the amount of light, and accordingly proportional to the rate of flow of fluid through the conduit 62 to which it is subjected. The photo-voltaic cell is shown connected in circuit with a control winding 131 of the saturable core reactor 130. The inductive impedance of the other winding 132 which is magnetically linked with the winding 131 will, as known, be inversely proportional to the current flow through the winding 131. This variation in inductance of the winding 132, which inferentially is proportional to the rate of fluid flow through the conduit 62, I employ to unbalance the bridge circuit comprising the winding 132, a saturable core reactor 133 and resistances 134 and 135.

To provide an accurate and sensitive measuring system I preferably employ the null or zero balance method wherein a variable effect of a measurable value is maintained equal to or in some predetermined proportion to an electrical effect produced by the rate of fluid flow, and hence the former becomes a measure of that rate of flow.

The bridge is provided with a conjugate conductor connecting diagonally opposite points of the bridge and inductively coupled through a transformer to a source of alternating current. A second conjugate conductor 15 is connected across the remaining diagonally opposite points of the bridge. Assuming the bridge to be in balance, no current will pass through the conjugate conductor 15. If now, there be a change in the rate of fluid flow, current will flow through the conjugate conductor 15. This current will have a certain polarity or phase relation with respect to the source.

The motor 9 is shown as having opposed pole windings and an alternating current energized field winding. If one pole winding is short circuited the motor will rotate in one direction; and if the other winding is short circuited the motor will rotate in opposite direction. If both windings are simultaneously short circuited the motor will not rotate in either direction.

Figure 2:
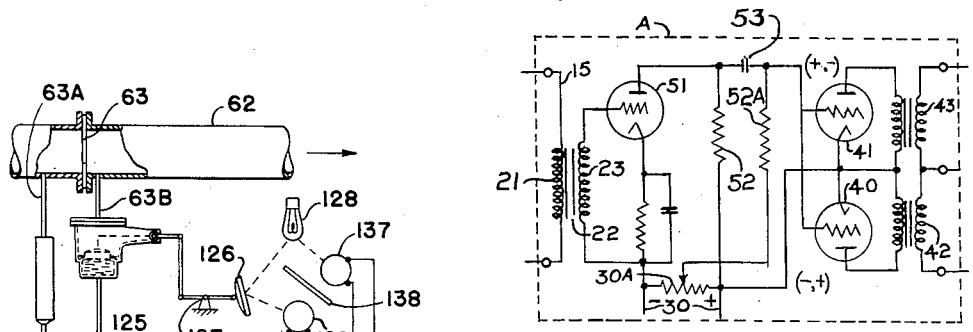
Fig. 2 is a wiring diagram of an amplifier.

Upon an unbalance of the bridge the particular winding short circuited to produce rotation of the motor 9 is determined by the polarity or the phase of the current in the conjugate conductor 15. Rotation of the motor 9 will vary the resistance 8A in proper direction to restore the bridge to balance. It is evident that upon a slight unbalance the current in the conjugate conductor 15 will be of relatively small magnitude. So that such minute currents may be used to control the selective short circuiting of the motor windings I provide electrical amplifying means A. In Fig. 2 I have shown and will describe the amplifying means A in detail, whereas with reference to Figs. 1 and 3 I have schematically indicated and will refer to the means as "amplifier A."

Connected in the conjugate conductor 15 is the primary 21 of a transformer 22 having a secondary 23, the opposite terminals of which are connected to the cathode and grid of an electron discharge device 51. The output circuit of the device 51 is shown as including a source of direct current 30 and a resistance 52. If desired the grid of the device 51 may be biased by means of a voltage divider 30A connected across the source 30 so that the device 51 is nonconducting or conducting a predetermined amount. With the bridge in balance so that no current passes through the conjugate conductor 15, a direct current having no pulsating component may or may not flow through the output circuit of the device 51, depending upon the bias of its grid. Assuming now that alternating current is passing through the conjugate conductor 15 the current of the device 51 will become pulsating in character. The amplitude of the pulsations will depend upon the amount of unbalance of the bridge and the phase of the pulsations with respect to the pulsations of the source will depend upon the sense of unbalance of the bridge.

The pulsating current passing through the output circuit of the device 51 is utilized to control the current transmission through a second pair of electron discharge devices 40 and 41, the output circuits of which are inductively coupled through transformers 42 and 43 to the circuits of the pole windings of motor 9 respectively. Such direct current as may normally flow through the output circuit of the device 51 will have no effect upon the potential impressed upon the grids of the devices 40 and 41 by virtue of a condenser 53. Upon passage of alternating current through the conjugate conductor 15 however the pulsating component of the current induced in the output circuit of the device 51 will pass through the condenser 53 and render either the device 40 or 41 conducting selectively in accordance with the sense of unbalance of the bridge.

The devices 40 and 41 may normally be maintained non-conducting by connecting their grids through a resistance 52A to a suitable point on the voltage divider 30A. To provide a high degree of sensitivity in some cases it may be preferable to maintain the devices 40 and 41 normally conducting, which may also be accomplished by connecting their grids to a suitable point on the divider 30A. In the latter case a pulsating current originating due to unbalance of the bridge will selectively render one or the other of the devices 40 and 41 more conducting and the other less conducting.

Selective control of the devices 40 and 41 is obtained by arranging them to have opposite polarity. That is when the anode of the device 40 is positive, the anode of the device 41 is negative, and vice versa. The pulsating current in the output circuit of the device 51 caused by an unbalance of the bridge has a polarity depending upon the sense of unbalance of the bridge. Thus upon the bridge being unbalanced in one sense the pulsating current will render the grid of the device 40 more positive with respect to its cathode during the same half cycle that its anode is positive, and hence the device will be rendered conducting. Conversely if the bridge is unbalanced in opposite sense the pulsating current in the output circuit of the device 51 will render the grid of the device 41 more positive with respect to its cathode during the same half cycle that its anode is positive, and hence the device will be rendered conducting. During the half cycle when the anodes of the devices 40 and 41 are negative with respect to their cathodes, both devices are of course non-conducting regardless of the potential of their grids.

When either the device 40 or 41 is rendered conducting, thereby short circuiting the secondary of the transformer 42 or 43 respectively, the impedance of the circuits of the pole windings is sufficiently reduced to effect rotation of the motor 9 in one direction or the other. Such rotation as heretofore described positions the index 1 relative to the chart 2 and scale 3, and simultaneously varies the resistance 8A to restore the bridge to balance.

The mirror 126 reflects more or less light from a suitable source 128 on to a light sensitive device such as a photovoltaic cell 129 in accordance with the rate of fluid flow. That is to say the arrangement may be such that as the flow of fluid through the conduit 62 increases the mirror 126 is positioned to reflect a correspondingly increasing amount of light on to the photo-voltaic cell 129. The photo-voltaic cell 129 is shielded from direct light rays from the source 128 by a suitable barrier 138.

The photo-voltaic cell 129 has an electrical characteristic such as resistance or potential variable in correspondence with the amount of light to which it is exposed. Desirably I employ this characteristic to control a saturable core reactor diagrammatically indicated at 130. In the specific embodiment I have disclosed, the photo-voltaic cell 129 produces a direct current potential proportional to the amount of light, and accordingly proportional to the rate of flow of fluid through the conduit 62 to which it is subjected. The photo-voltaic cell is shown connected in circuit with a control winding 131 of the saturable core reactor 130. The inductive impedance of the other winding 132 which is magnetically linked with the winding 131 will, as known, be inversely proportional to the current flow through the winding 131. This variation in inductance of the winding 132, which inferentially is proportional to the rate of fluid flow through the conduit 62, I employ to unbalance a bridge circuit comprising the winding 132, a saturable core reactor 133 and resistances 134 and 135.

The bridge in Fig. 1 is maintained in balance by varying the relative amounts of resistance 8A included in two adjacent arms of the bridge. Upon a change in inductance of the winding 132 the bridge becomes unbalanced, causing a current of certain polarity to pass through the conjugate conductor 15. The bridge is restored to balance by the motor 9 which positions contact 120 along resistance 8A. As the inductance of the winding 132 is proportional to the rate of fluid flow through the conduit 62 the position of the contact 120 and accordingly of the index 1 is a measure of that rate of fluid flow.

Normally the saturable core reactor 133 has a constant impedance inasmuch as the control winding 136 thereof is energized by a photovoltaic cell 137 which is directly exposed to the light rays from the source 128. The reactor 133 serves, however, to compensate the bridge circuit for variations in light intensity for it will be observed that any variation in light from the source 128 will affect the reactors 130 and 133 equally, thereby equally varying the impedance of the two arms of the bridge.

Figure 3:
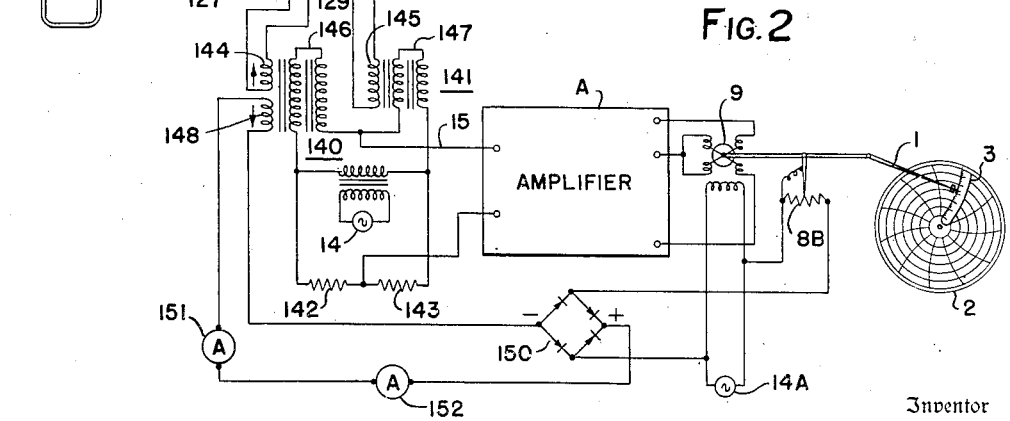
Fig. 3 illustrates a further embodiment of my invention.

In Fig. 3 I illustrate a further embodiment of my invention incorporating an alternating current bridge having as arms the output windings 146, 147 of saturable core reactors 140, 141 and resistors 142, 143. The photo cell 129 controls the energization of a control winding 144 of the reactor 140 and therefore varies the impedance of the output winding 146 in correspondence with changes in the rate of fluid flow through the conduit 62. The photo cell 137 compensates the bridge for variations in intensity of the light source 128 by varying the energization of a control winding 145 of the reactor 141. The bridge is maintained in balance by varying the saturation of the reactor 140, and hence the impedance of the output winding 146 by means of a secondary control winding 148, which opposes the control winding 144.

The secondary control winding 148 is energized with direct current by means of a bridge rectifier 150, which is provided with alternating current from the source 14A. Connected in circuit with the alternating current side of the bridge 150 is a resistance 8B varied by the motor 9. Assuming a change in the rate of fluid flow through the conduit 62, for example an increase, the impedance of the output winding 146 will decrease proportionately causing a current to pass in the conjugate conductor 15 of certain phase relative to the source 14. This current, through amplifier A, will effect operation of motor 9 to decrease the portion of resistance 8B in circuit with the rectifier 150, and hence increase the energization of the secondary control winding 148. When the impedance of the output winding 146 has been restored to the original value the bridge will again be in balance and no further change in the energization of secondary control winding 148 will occur until there has been a further change in rate of fluid flow through the conduit 62.

Inasmuch as the current through the secondary control winding 148 is proportional to rate of fluid flow through the conduit 62 I may connect in circuit therewith indicating, recording and/or integrating current responsive devices such as the ammeters schematically indicated at 151 and 152 to exhibit rate of fluid flow. These devices may be placed adjacent or remote from each other and from the index 1 to exhibit at a plurality of locations the rate of fluid flow through conduit 62.

In accordance with the patent statutes I have described certain specific embodiments of my invention. They should however be taken merely as illustrative and not as defining the scope of my invention.

What I claim as new, and desire to secure by Letters Patent of the United States, is:

1. In apparatus of the type described, in combination an impedance bridge, a saturable core reactor having a saturating winding and an output winding, light sensitive means for controlling the current in the saturating winding in accordance with the change in a variable, the output winding of said reactor connected in one of the arms of said bridge, a balancing impedance adjustably divided between two other arms of said bridge, a first conjugate conductor connecting two diagonally opposite points of said bridge, a source of alternating current potential in said conjugate conductor, a second conjugate conductor connecting two other diagonally opposite points of said bridge, means for adjustably dividing said balancing impedance to balance the bridge including a pair of electron discharge devices, and means for rendering one or the other of said devices conducting in correspondence with the relative phase of the alternating current in the two conjugate conductors.

2. In apparatus of the type described an electric network, a saturable core reactor connected in said network and having a saturating winding and an output winding, a light source, means sensitive to light from said source for controlling the energization of the saturating winding, means responsive to the change of a variable for varying the light on said light sensitive means in correspondence with the change in said variable, a second saturable core reactor connected in said network and having a saturating winding and an output winding, a second light sensitive means sensitive directly to said light source for controlling the energization of the saturating winding of the second saturable core reactor thereby compensating the network for variations in the light source, and said network being in control of means for advising the change in said variable.

3. Apparatus including in combination, a balanceable electric network including two saturable core reactors each having a saturating winding and an output winding, a light source, and light sensitive means associated with each saturable core reactor sensitive to light from said source and controlling the energization of the saturating winding, one of said light sensitive means receiving unobstructed light from the source and the other light sensitive means receiving a variable amount of light from the source depending upon a variable condition or position to be measured.

4. Apparatus including in combination, an impedance bridge, a saturable core reactor having an output winding in one leg of said bridge and having a controlling saturating winding, a second saturable core reactor having an output winding in a second leg of said bridge and having a controlling saturating winding, a light source, means directly sensitive to the light from said light source controlling the saturating winding of one of said saturable core reactors, and means variably sensitive to the light from said light source controlling the saturating winding of the other of said saturable core reactors.

5. The combination of claim 4 including, a fixed resistance in each of the remaining two legs of said bridge, and an adjustable balancing resistance included in said remaining legs and proportioned between the two legs to balance the bridge.

JOHN D. RYDER.